May 13, 1930.  D. PARRETT  1,758,758
STEERING MECHANISM FOR TRACTORS
Filed Feb. 19, 1927  2 Sheets-Sheet 1
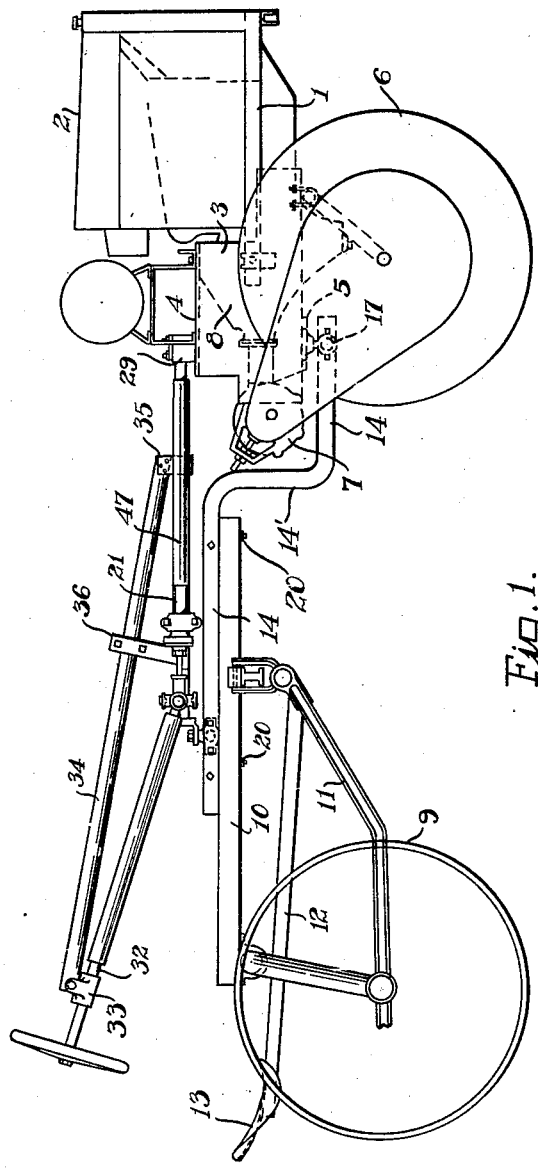
INVENTOR.
Dent Parrett
BY Staley & Welch
ATTORNEYS.

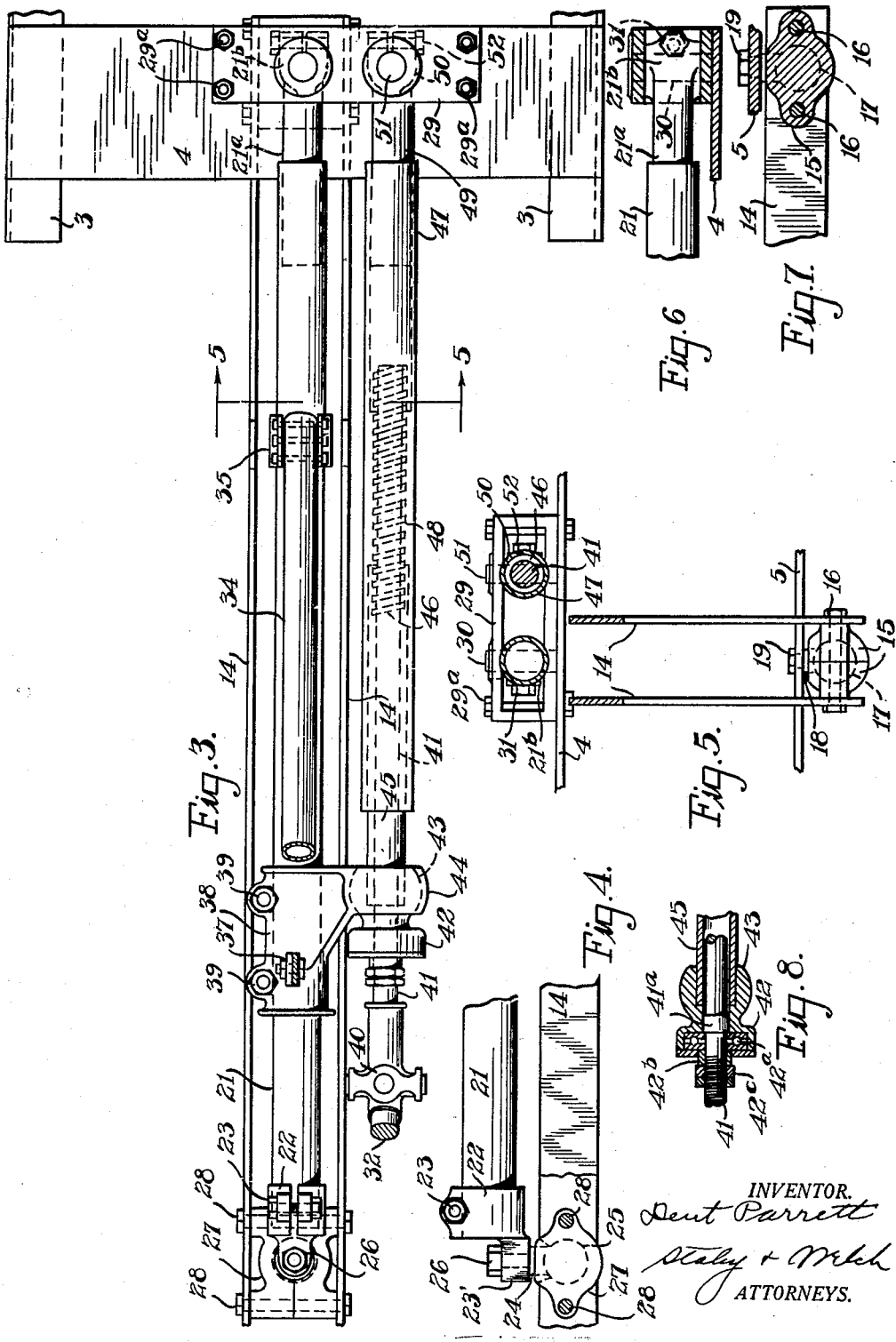

Patented May 13, 1930

1,758,758

UNITED STATES PATENT OFFICE

DENT PARRETT, OF SPRINGFIELD, OHIO

STEERING MECHANISM FOR TRACTORS

Application filed February 19, 1927. Serial No. 169,614.

My invention relates to steering mechanism, more particularly relating to steering mechanism for tractors.

The object of the invention is to provide a steering mechanism for tractors which will be simple in construction and effective in operation.

The further object of the invention is to provide for supporting the steering mechanism by a draft appliance to simplify the connection of the tractor with the implement drawn thereby.

In the accompanying drawings:

Fig. 1 is a side elevation of so much of a tractor and the implement to be drawn thereby as is necessary to explain my improvements.

Fig. 2 is a top plan partly in section of a portion of the steering mechanism.

Fig. 3 is a top plan view of the hitching devices and steering mechanism.

Fig. 4 is a side elevation of the connection between the draft member and its brace.

Fig. 5 is a section on the line 5—5 of Fig. 3.

Fig. 6 is a side elevation of the forward end of the brace rod, showing in section the block to which it is pivoted and the plate which supports the block.

Fig. 7 is a side elevation of the forward end of the draft member and its universal connection with the supporting plate, a portion of the plate being shown in section.

Fig. 8 is a detail in section of the thrust bearing for the steering shaft.

The tractor to which my improvements have been applied is similar to the one described in my pending application Serial No. 755,131, filed December 11, 1924, 1 representing the main frame upon which the engine 2 is mounted and having side supporting members 3 which are connected by an upper supporting plate 4 and a lower supporting plate 5. The tractor is a two-wheel affair, 6 representing one of the carrying wheels, the wheels being driven by chains from the differential mechanism mounted in the axle structure 7 which is closely connected with the transmission mechanism in the housing 8 in the manner more fully described in my pending application Serial No. 59,001, filed September 28, 1925.

The implement which is shown attached to the tractor in the present case is a cultivator, so much thereof being shown as is necessary to illustrate the improvements, 9 representing one of the carrying wheels, 10 the draft pole, 11 one of the cultivator beams and 12 the seat support carrying at its rear end the seat 13.

There is employed a draft structure consisting of a draft member which is rigidly connected with the pole 10 and connected with the tractor by a universal connection, and also includes a brace connected with the draft member by a universal connection and connected with the tractor by a pivotal connection. The particular form of the draft member depends upon the implement which is to be attached to the tractor, but in the present case I have shown the draft member formed of two parallel bars 14 having the rear and forward ends projected in a horizontal direction and connected by an intermediate vertical portion 14' so that the rear ends may be in the present embodiment elevated to a higher plane than the forward ends to permit the attachment to the pole 10. The forward ends of the two draft bars are spaced by a two-part socket member 15 with the bars and socket member rigidly united by a pair of bolts 16 (Fig. 5). The spherical socket in the member 15 receives a ball 17 on the lower end of a stud 18 the upper end of which is reduced and threaded, the reduced end being received by an aperture in the bottom supporting plate 5 and clamped thereto by a nut 19 threaded thereon. The rear horizontal portions of the draft bars 14 are secured to the pole 10 by bolts 20, which pass through spacing blocks (not shown) secured between the bars and also through the pole.

The brace for the draft member is shown at 21, and is preferably of tubular form. Secured to the rear end of this brace is a split collar 22 (Figs. 3 and 4), the collar being clamped to the brace by a bolt 23. The collar 22 has an apertured ear 23' to receive the reduced end of a stem 24 having formed on the lower end thereof a ball 25, a nut 26 threaded on the stem serving to securely fasten the stem and the ball to the ear. The rear ends of the draft bars 14 are spaced by a two-part socket member 27, the socket and bars 14 being secured together by the bolts 28. The spherical socket of this member 27 receives the ball 25. The forward end of the brace 21 has pressed therein a projecting shank 21ª, having at its forward end a split collar 21ᵇ which projects into a hollow open-sided block 29 which is secured by the bolts 29ª to the upper supporting plate 4. The collar 21ᵇ is clamped to a pivot pin 30 by the bolt 31; the ends of the pin projecting beyond the shank and being journaled in the upper and lower walls of the block 29. The vertical axis of this pin is in vertical alignment with the vertical axis of the ball 17.

As a result of this arrangement it will be seen that the forward end of the draft member 14 is connected with the tractor frame by a universal joint and that the brace 21 therefor is connected with the draft member by a universal joint and also has a pivotal connection with the tractor frame; this pivotal connection being in vertical alignment with the universal connection of the draft member with the tractor frame.

This arrangement not only connects the tractor and implement rigidly together against relative vertical swinging movement, but permits the tractor and implement to have the relative lateral movement necessary for steering, and also permits either side of the tractor or the implement to rise or drop in passing over obstructions or depressions and thus eliminate tortional stresses. This arrangement also permits the parts to accommodate themselves to the position of the tractor when one of its wheels is on plowed ground and the other wheel running on unplowed ground or any other conditions which may be met with in the travel of the tractor and implement. The brace 21 acts to brace the draft member against stress due to the torque of the drive wheels, the tendency of which is to depress the forward end of the draft bar 14.

A rear steering shaft 32 is journaled in a bearing 33 carried at the rear end of a support 34; this support being fastened at its forward end to a clip 35 secured to the brace 21 and being braced by a bar 36 which is bolted to an ear 37 on a sleeve 38, secured to the brace member 21 by the bolts 39. The forward end of the steering shaft 32 is connected through a universal joint 40 to a second forward shaft 41. The rear end of this shaft 41 has an integral collar or enlargement 41ª which is journaled in the forward end wall of a housing 42 within which is located a ball thrust bearing indicated at 42ª which cooperates with the collar 42ᶜ (Fig. 8). This bearing housing 42 is formed integrally with a rounded head 43 which is clamped in a similarly formed socket in a two-part clamp 44, one-half of which is integrally connected with the sleeve 38. A sleeve member 45 has its rear end pressed into the bore of the head 43 with a tight fit and projects forwardly to form a guide. The shaft 41 projects forwardly loosely through the head 43 and sleeve 45 and has its forward end provided with screw-threads 46. A sleeve-like member 47 has its rear end mounted upon the guide 45 and is also provided with an internally threaded portion or nut 48 engaged with the threads of the shaft 41. The forward end of this sleeve 47 has a shank 49, the forward end of which is provided with a split collar 50 which is clamped to a pivot pin 51 by a bolt 52 (Fig. 5); the pivot pin having its ends projecting beyond the sleeve and journaled in the upper and lower walls of the block 29 eccentrically to the connection between the tractor frame and draft member 14 and its brace 21. The shaft 41 is immovable longitudinally by reason of the thrust bearing in the housing 42 so that when the shaft 42 is turned, the sleeve member 47 is moved forwardly or rearwardly which acts to turn the tractor wheels 6 in the desired direction to steer the structure.

Further, it will be noted that the steering devices are supported by the draft appliances so that in connecting an implement with a tractor it is only necessary to connect the draft member 14 thereto. This draft member 14 will be suitably formed for convenient attachment to the implement whether it be a cultivator, as shown, or a corn planter, or other ground breaking, cultivating or seed planting implement.

Having thus described my invention, I claim:

1. In a steering mechanism for a wheeled structure in which two wheels are connected by members having a vertical pivotal connection with the structure midway the wheels, a bracket having a rounded clamping portion, a rounded head clamped therein, a bearing and a guide carried by said head, a rotatable shaft mounted in said bearing and confined against longitudinal movement, said shaft being projected through said guide, a tubular member slidably mounted upon said guide into which said shaft extends, said tubular member and said shaft having interengaging screw threads, the forward end of said tubular members having an eccentric pivotal connection with the wheel connecting member, and manual means for rotating said shaft.

2. In a steering mechanism for a two-wheel tractor and implement connected together by draft appliances of a kind to be attached to a conventional form of implement in which the connections are such as to permit the tractor wheels to swing laterally for steering purposes, said draft appliances comprising a draft bar and a brace member therefor, a support secured to said brace member having a bearing and a guide, a rotatable shaft journaled in the said bearing and projecting through said guide, manual means carried by the draft appliances for rotating said shaft, a sleeve member slidably mounted upon said guide and eccentrically pivoted with the tractor, said shaft projecting into said tubular member, and cooperating screw threads carried by said shaft and tubular members.

3. The combination of a two-wheel tractor structure and the implement structure, a draft member connected with said tractor by universal connection and having a rigid connection with the frame of said implement, a brace member pivotally connected with said tractor and having a universal connection with said draft member, and steering devices supported by said brace.

4. The combination of a two-wheeled tractor structure, an implement structure, a draft member connected with said tractor structure by universal connections and having a rigid connection with the frame of said implement, a brace member pivotally connected with said tractor structure and having a universal connection with said draft member, and steering devices mounted upon said brace member consisting of a rear rotatable member confined against longitudinal movement and having a steering wheel, a non-rotatable member pivotally connected with said tractor, and interengaging screw threads between said members.

5. In a steering mechanism, a two-wheeled tractor, an implement, draft appliances, means for connecting said appliances with said tractor and implement to permit the draft appliances to move bodily with the implement when one side of the implement rises or falls due to uneven travel, steering devices mounted upon said draft appliances consisting of a rear rotatable member confined against longitudinal movement and having a steering wheel, a non-rotatable member pivotally connected to said tractor, and interengaging screw threads between said members.

In testimony whereof, I have hereunto set my hand this 17th day of February, 1927.

DENT PARRETT.